US008818139B2

(12) United States Patent
Bae

(10) Patent No.: US 8,818,139 B2
(45) Date of Patent: Aug. 26, 2014

(54) METHOD AND APPARATUS FOR DISPLAYING IMAGES RELATED TO A SELECTED TARGET POINT ON AN ELECTRONIC MAP BASED ON AZIMUTH AND VIEW ANGLE INFORMATION

(71) Applicant: Samsung Electronics Co., Ltd., Suwon-si (KR)

(72) Inventor: Sung-cheol Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/655,691

(22) Filed: Oct. 19, 2012

(65) Prior Publication Data
US 2013/0039546 A1    Feb. 14, 2013

Related U.S. Application Data

(62) Division of application No. 12/011,808, filed on Jan. 30, 2008, now Pat. No. 8,315,438.

(30) Foreign Application Priority Data
Aug. 20, 2007    (KR) .......................... 10-2007-0083431

(51) Int. Cl.
*G06K 9/60*    (2006.01)

(52) U.S. Cl.
USPC ........................................ 382/305; 382/100

(58) Field of Classification Search
None
See application file for complete search history.

(56) References Cited

U.S. PATENT DOCUMENTS

| | | | | |
|---|---|---|---|---|
| 5,790,121 | A * | 8/1998 | Sklar et al. | 715/853 |
| 6,266,615 | B1 * | 7/2001 | Jin | 701/488 |
| 6,437,797 | B1 | 8/2002 | Ota | |
| 6,492,985 | B1 * | 12/2002 | Mutz et al. | 345/419 |
| 6,819,356 | B1 * | 11/2004 | Yumoto | 348/231.2 |
| 6,868,337 | B2 * | 3/2005 | Muramatsu | 701/431 |
| 6,883,146 | B2 * | 4/2005 | Prabhu et al. | 715/854 |

(Continued)

FOREIGN PATENT DOCUMENTS

| | | |
|---|---|---|
| GB | 2 424 730 A | 10/2006 |
| JP | 11-282861 A | 10/1999 |

(Continued)

OTHER PUBLICATIONS

Google Maps Street View is fantastic!—Robert's talk, May 31, 2007, pp. 1-10.*

(Continued)

*Primary Examiner* — Jayesh A Patel

(74) *Attorney, Agent, or Firm* — Drinker Biddle & Reath LLP

(57) ABSTRACT

An image reproduction apparatus for displaying images of image files including an image of a target point to be observed by using image files located adjacent to the target point. A method of reproducing an image of an image file on an electronic map including the image file so that position information of the image file matches position information on the electronic map includes: (a) selecting a target point to be observed on the electronic map and obtaining position information of the target point; (b) setting a search range of image files on the electronic map; (c) searching for image files including an image of the target point within the set search range; and (d) displaying images of the found image files on the electronic map.

19 Claims, 10 Drawing Sheets

(56) References Cited

U.S. PATENT DOCUMENTS

| | | | |
|---|---|---|---|
| 6,992,583 B2* | 1/2006 | Muramatsu | 340/539.32 |
| 7,031,728 B2* | 4/2006 | Beyer, Jr. | 455/456.3 |
| 7,206,695 B2* | 4/2007 | Morita et al. | 701/454 |
| 7,688,227 B1* | 3/2010 | Tosun et al. | 340/995.1 |
| 7,764,954 B2* | 7/2010 | Beyer, Jr. | 455/416 |
| 7,978,207 B1* | 7/2011 | Herf et al. | 345/619 |
| 7,978,219 B1* | 7/2011 | Imes | 348/207.1 |
| 7,979,204 B2* | 7/2011 | Kobuya et al. | 701/439 |
| 8,010,279 B2* | 8/2011 | Kobuya et al. | 701/438 |
| 8,031,238 B2* | 10/2011 | Uchiyama et al. | 348/231.3 |
| 8,169,505 B2* | 5/2012 | Hoshi | 348/231.3 |
| 2004/0054428 A1* | 3/2004 | Sheha et al. | 700/56 |
| 2004/0064479 A1 | 4/2004 | Iga | |
| 2004/0100506 A1 | 5/2004 | Shiota et al. | |
| 2004/0208372 A1 | 10/2004 | Boncyk et al. | |
| 2005/0137788 A1 | 6/2005 | Kimura | |
| 2005/0162523 A1 | 7/2005 | Darrell et al. | |
| 2005/0206733 A1* | 9/2005 | Miyamoto | 348/207.1 |
| 2006/0080035 A1 | 4/2006 | Daubert et al. | |
| 2006/0132602 A1 | 6/2006 | Muto et al. | |
| 2006/0203012 A1 | 9/2006 | Nakajima | |
| 2006/0271287 A1* | 11/2006 | Gold et al. | 701/211 |
| 2006/0277188 A1 | 12/2006 | Irish et al. | |
| 2007/0083329 A1 | 4/2007 | Im | |
| 2007/0115373 A1* | 5/2007 | Gallagher et al. | 348/231.3 |
| 2007/0155373 A1* | 7/2007 | Kim | 455/418 |
| 2007/0162942 A1 | 7/2007 | Hamynen et al. | |
| 2007/0189181 A1 | 8/2007 | Kirk et al. | |
| 2007/0258642 A1* | 11/2007 | Thota | 382/173 |
| 2008/0021777 A1* | 1/2008 | Mack et al. | 705/14 |
| 2008/0040693 A1 | 2/2008 | Toyama et al. | |
| 2008/0104011 A1 | 5/2008 | Shibasaki et al. | |
| 2008/0109760 A1* | 5/2008 | Stambaugh | 715/835 |
| 2008/0109761 A1* | 5/2008 | Stambaugh | 715/853 |
| 2008/0132252 A1* | 6/2008 | Altman et al. | 455/457 |
| 2010/0123737 A1* | 5/2010 | Williamson et al. | 345/672 |
| 2011/0019904 A1* | 1/2011 | Andersson et al. | 382/154 |

FOREIGN PATENT DOCUMENTS

| | | | | |
|---|---|---|---|---|
| JP | 2000-57320 A | 2/2000 | | |
| JP | 2007-278807 A | 10/2007 | | |
| KR | 10-2008-0063687 A | 7/2008 | | |
| KR | 1020090002148 A | 1/2009 | | |
| WO | 2005/017780 A1 | 2/2005 | | |
| WO | 2007/004519 A1 | 1/2007 | | |
| WO | WO 2007004519 A1 * | 1/2007 | | G06T 1/00 |

OTHER PUBLICATIONS

Our history in depth, Google, Jan. 7, 2012, pp. 1-40.*

Google Introduces Street View in Google Maps (May 25, 2007-May 12, 2008), Jeremy Norman & Co., Inc., pp. 1-2.*

Jeita CP-3451, Exchangle image file format for digital still cameras: Exif Version 2.2, Japan Electronics and Information Technology Industries Association, Apr. 2002, pp. 1-154.*

Digital Photography Review, EXIF Angle of View, Dec. 10, 2007, pp. 1-4, available at http://www.dpreview.com/forums/thread/2181790.*

Examination Report established for GB0802676.7 (Jul. 19, 2011).

Examination Report established for GB0802676.7 (Jan. 6, 2012).

Office Action issued in related application KR10-2007-0083431, Sep. 30, 2013, 11 pages.

Notice of Allowance issued for KR 10-2007-0083431 (Apr. 22, 2014).

* cited by examiner

FIG. 4

| | |
|---|---|
| Date Time | 2007:04:23 17:10:20 |
| Exposure Time | 1/45 Sec |
| FNumber | F3.5 |
| ISO | 200 |
| Focal Length | 6.60mm ← FOCAL LENGTH: ACTUAL FOCAL LENGTH OF CAMERA |
| Flash | Not fired |
| Exposure Mode | Auto |
| White Balance | Auto |
| Focal Length(35mm) | 37mm ← 35mm CONVERSION FOCAL LENGTH |
| North or South Latitude | 37°31'52.28" N |
| East or West Longitude | 126°55'34.23" E |
| Azimuth | 50° |
| ⋮ | ⋮ |
| Thumbnail Image | |
| Main Image | |

METHOD AND APPARATUS FOR DISPLAYING IMAGES RELATED TO A SELECTED TARGET POINT ON AN ELECTRONIC MAP BASED ON AZIMUTH AND VIEW ANGLE INFORMATION

CROSS-REFERENCE TO RELATED PATENT APPLICATION

This application is a divisional application of U.S. patent application Ser. No. 12/011,808, filed Jan. 30, 2008, now U.S. Pat. No. 8,315,438, which claims the benefit of Korean Patent Application No. 10-2007-0083431, filed on Aug. 20, 2007, in the Korean Intellectual Property Office, the disclosures of which are incorporated herein in their entirety by reference.

BACKGROUND

Various embodiments of the invention relate to an image reproduction apparatus using image files comprised in an electronic map, a display method for the same, and a recording medium for recording a program for executing the method, and more particularly, to an image reproduction apparatus for displaying images of image files including an image of a target point to be observed on an electronic map by using image files located adjacent to the target point, a display method for the same, and a recording medium for recording a program for executing the method.

Electronic maps are implemented using digital information so that information previously only with conventional paper maps can be made available by personal computers (PCs) and other means, and allow users to easily search for position information, such as latitude, longitude, address, and so on, by associating with a Geographic Information System (GIS) in which various kinds of geographic information are stored in a database. Recently, updated current map information can be maintained by using electronic maps associated with Internet communication technology, and electronic maps providing time information having a 1-second error for 36-thousand years and position information having horizontal and vertical errors each having a 10~15-meter error using Global Positioning System (GPS) technology can be achieved.

In addition, by introducing GPS technology to digital capturing devices, such as digital cameras, camcorders, camera-equipped cellular phones, camera-equipped electronic organizers, and personal digital assistants (PDAs), to capture images and store the captured images, accurate position information of the captured images can be stored.

To fulfill the variety of demands of users for digital capturing devices, captured images are used in an electronic map field, as described above. In other words, by allowing a user to be able to store image information of a captured photograph in an electronic map, the user can search for position information and obtain various kinds of image information using the electronic map. For example, Google Earth, which is an Internet-based electronic map search service, provides accurate position information and satellite photograph information to users using GPS technology. Google Earth also provides a service of displaying various image files captured and stored by each user on an electronic map by allowing the user to register an image file, such as a photograph captured by the user, on the electronic map.

According to the wide spread use of digital capturing devices and the variety of methods of using the digital capturing devices, the speed of registering image information on an electronic map has rapidly increased. However, the methods of variously using image files are very insufficient. For example, when a user wants to observe an image of a target point on an electronic map, only if an image file registered on a position of the target point exists, the image of the target point can be observed using the image file. Thus, if there is no image file registered on the position of the target point, the image of the target point cannot be observed. In addition, even if there is an image file registered for the position of the target point, since only the image file itself is displayed, various image files located adjacent to the target point still cannot be used.

SUMMARY

Various embodiments of the invention provide an image reproduction apparatus for displaying images of image files including an image of a target point to be observed on an electronic map by using image files located adjacent to the target point, a display method for the same, and a recording medium for recording a program for executing the method.

According to an embodiment of the invention, there is provided a method of reproducing an image of an image file on an electronic map including the image file so that position information of the image file matches position information on the electronic map, the method comprising the steps: (a) selecting a target point to be observed on the electronic map and obtaining position information of the target point; (b) setting a search range of image files on the electronic map; (c) searching for image files including an image of the target point within the set search range; and (d) displaying images of the found image files on the electronic map.

Step (b) may comprise setting the search range within a currently displayed screen on the electronic map in which the target point is included.

Step (b) may comprise setting the search range within a predetermined radius range based on the target point.

The predetermined radius range may be set in association with an altitude of an image located at the target point.

Step (c) may comprise: detecting image files having position information included within the set search range; assigning an order to the detected image files; and analyzing azimuth information and view angle information of the image files in the assigned order and determining whether the image files include an image of the target point.

The analyzing of the azimuth information and the view angle information of the image files in the assigned order and determining of whether the image files may include the image of the target point may be determined using the Formula $|\alpha-\beta|\leq\omega/2$, where $\alpha$ denotes an azimuth angle with which an image of an image file is oriented, $\beta$ denotes an azimuth angle of a line connecting between the image file and the target point, and $\omega$ denotes an angle of view of the image file.

$\beta$ may be calculated using the Formula $$\tan\beta = \frac{E_t - E_i}{N_t - N_i},$$

where $E_t$ denotes a longitude coordinate of the target point, $E_i$ denotes a longitude coordinate of the image file, $N_t$ denotes a latitude coordinate of the target point, and $N_i$ denotes a latitude coordinate of the image file.

$\omega$ may be calculated from a 35 mm conversion focal length.

$\omega$ may be calculated using the Formula $$\frac{CCDdiagonallength}{2} = f * \tan\left(\frac{\omega}{2}\right),$$

where f denotes a focal length, ω denotes an angle of view, and the units of the focal length and the diagonal length are in mm.

The image file may be displayed on the electronic map in a shape of a predetermined icon indicating position information.

Alternatively, the image file may be displayed on the electronic map in a shape of a predetermined icon indicating position information, azimuth information, and view angle information.

According to another embodiment of the invention, there is provided a method of reproducing an image of an image file on an electronic map on which a predetermined icon indicating position information, azimuth information, and view angle information of the image file is displayed, wherein position information of the image file matches position information on the electronic map, the method comprising: (a) selecting an icon oriented toward an image of a target point to be observed using the icon shape; (b) executing the selected icon; and (c) displaying an image of an image file linked to the icon on the electronic map.

According to another embodiment of the invention, there is provided an apparatus for reproducing an image of an image file on an electronic map including the image file so that position information of the image file matches position information on the electronic map, the apparatus comprising: a target point selecting unit that selects a target point to be observed on the electronic map and obtains position information of the target point; a search range setting unit that sets a search range of image files on the electronic map; an image file search unit that searches for image files including an image of the target point in the set search range; and a display unit that displays images of the found image files on the electronic map.

The image file search unit may comprise: a detecting unit that detects image files having position information included within the set search range; an order assigning unit that assigns an order to the detected image files; and a determining unit that analyzes azimuth information and view angle information of the image files in the assigned order and determines whether the image files include an image of the target point.

The analyzing of the azimuth information and the view angle information of the image files in the assigned order and determining of whether the image files may include the image of the target point may be determined using the Formula $$|\alpha - \beta| \le \frac{\omega}{2},$$

where α denotes an azimuth angle with which an image of an image file is oriented, β denotes an azimuth angle of a line connecting between the image file and the target point, and ω denotes an angle of view of the image file.

β may be calculated using the Formula $$\tan\beta = \frac{E_t - E_i}{N_t - N_i},$$

where $E_t$ denotes a longitude coordinate of the target point, $E_i$ denotes a longitude coordinate of the image file, $N_t$ denotes a latitude coordinate of the target point, and $N_i$ denotes a latitude coordinate of the image file.

ω may be calculated from a 35 mm conversion focal length. ω may be calculated using the Formula $$\frac{CCDdiagonallength}{2} = f * \tan\left(\frac{\omega}{2}\right),$$

where f denotes a focal length, ω denotes an angle of view, and the units of the focal length and the diagonal length are in mm.

The electronic map information may be provided real-time from an external server using the Internet or other network communication.

The apparatus may be a personal computer (PC) or personal digital assistant or a car navigator or a similar system.

According to another embodiment of the invention, there is provided an apparatus for reproducing an image of an image file on an electronic map on which predetermined icons indicating position information, azimuth information, and view angle information of the image file are displayed, wherein position information of the image file matches position information on the electronic map, the apparatus comprising: an icon selecting unit that selects an icon oriented toward an image of a target point to be observed using the icon shape; an icon execution unit that executes the selected icon; and a display unit that displays an image of an image file linked to the icon on the electronic map.

According to another embodiment of the invention, there is provided a computer readable recording medium recording a program for executing the method of reproducing an image on an electronic map.

BRIEF DESCRIPTION OF THE DRAWINGS

The above and other features and advantages will become more apparent by describing in detail exemplary embodiments thereof with reference to the attached drawings in which:

FIG. 4 illustrates Exif information of an image file, which includes view angle information and azimuth information of an image;

DETAILED DESCRIPTION

The invention will be described in detail by explaining embodiments of the invention with reference to the attached drawings.

The embodiments of the invention are applied to an electronic map including image files of which position information of the image files matches position information on the electronic map. For example, the embodiments of the invention can be applied to an electronic map including satellite photographs provided by Google Earth, which is an Internet-based electronic map search service, or any electronic maps provided to various navigators installed in vehicles to provide traffic information.

The electronic map includes map information and image information, such as a photograph captured by a user. In this case, position information of the image captured by the user is registered on the electronic map so that the position information of the image captured by the user matches position information on the electronic map. For example, if position information of an image file matches position information of a predetermined position on an electronic map, an icon indicating that the image file exists on the predetermined position on the electronic map can be displayed, and by executing the icon, an image of the image file registered on the electronic map can be displayed on the electronic map. As obvious to one skilled in the art, it will be easily understood by one of ordinary skill in the art that the invention is applied to an electronic map edited to match position information of an image with position information on the electronic map by means of various methods besides the method using an icon.

In addition, image information includes position information, as described above, and azimuth information, which is information regarding an image capturing direction of a capturing device, and view angle information of an image, as will be described later.

When an image file, such as a captured photograph, is registered on a target point to be observed on an electronic map, a user may directly observe an image of the target point by using the image file registered on the target point or executing an icon. However, if any image is not registered on the target point to be observed on the electronic map, or if the user wants to observe an image of the target point by using image files located adjacent to the target point, a neighbor image search mode (refer to S100 of FIG. 1) is activated, and the embodiments to be described are applied.

Figure 1:
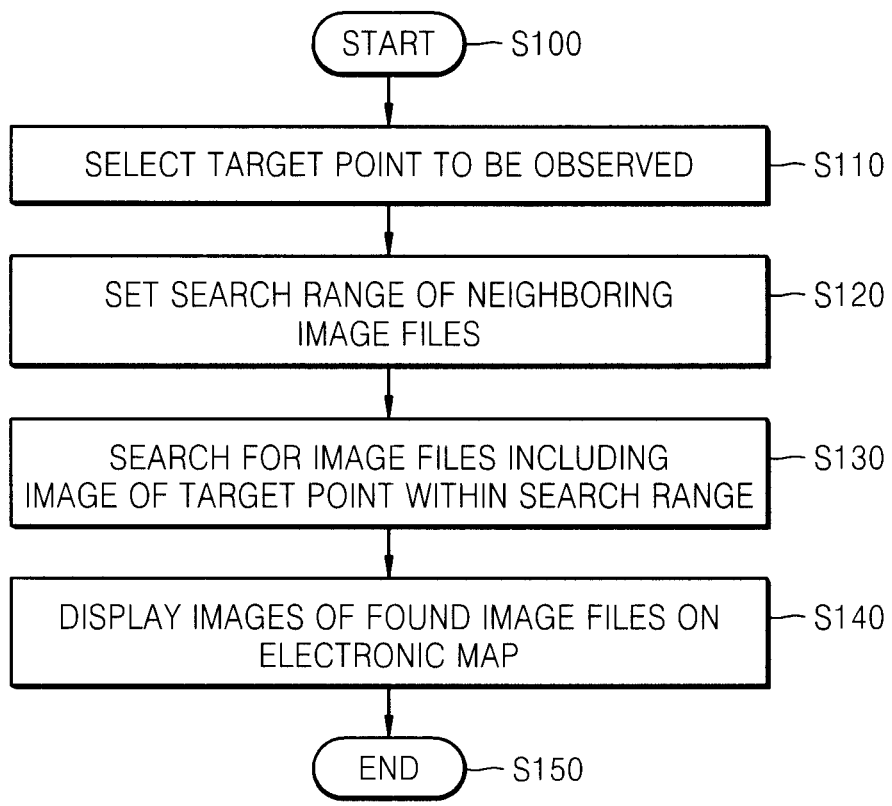
FIG. 1 is a schematic flowchart of an image reproduction method, according to an embodiment of the invention.
Figure 2:
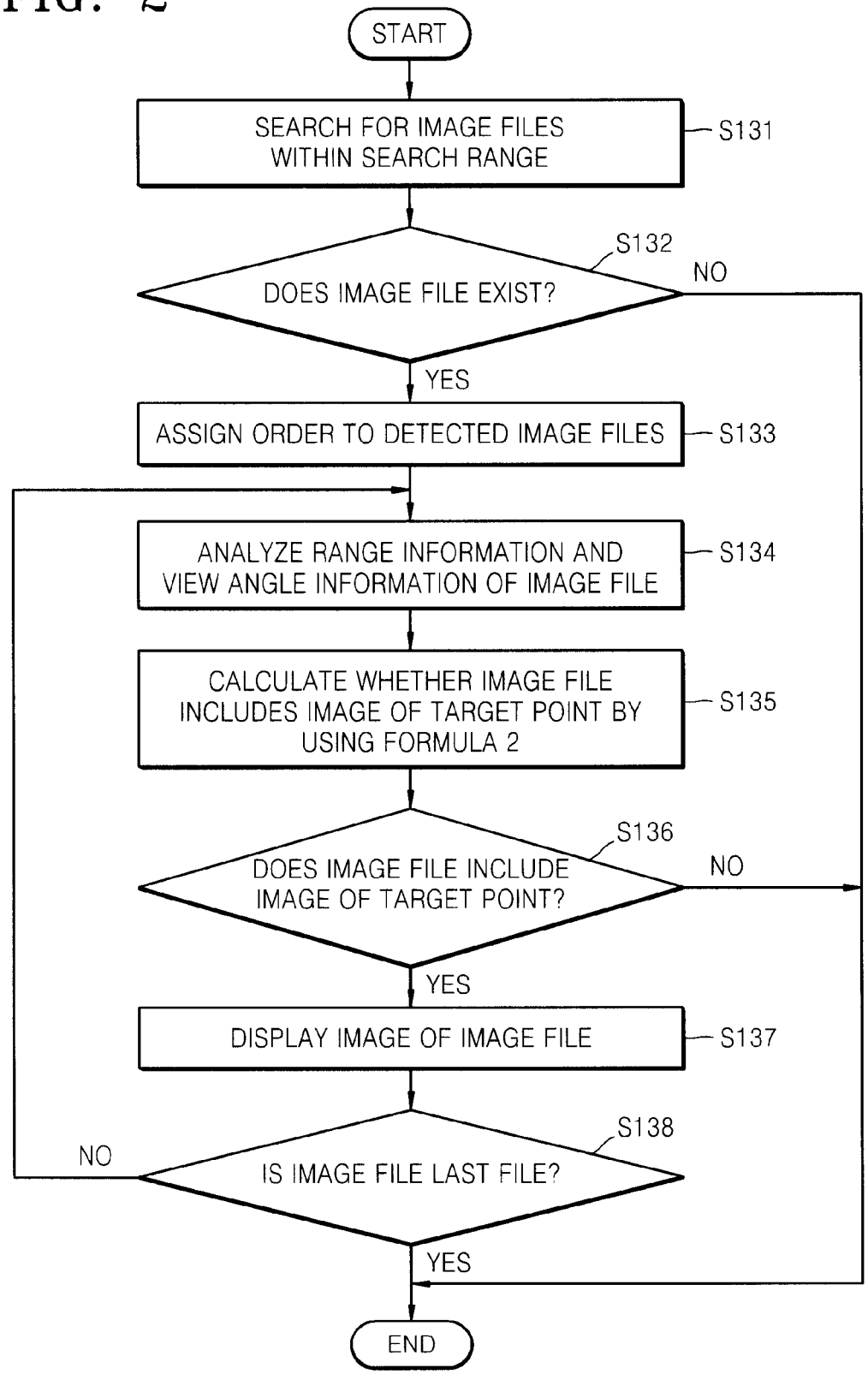
FIG. 2 is a flowchart of a portion of the method illustrated in FIG. 1, according to an embodiment of the invention.

FIG. 1 is a schematic flowchart of an image reproduction method, according to an embodiment of the invention, and FIG. 2 is a flowchart of a portion of the method illustrated in FIG. 1, according to an embodiment of the invention.

The image reproduction method according to an embodiment of the invention will now be described with reference to FIGS. 1 and 2.

Referring to FIG. 1, a user selects a target point to be observed on the electronic map, as described above, in step S110, so that position information of the target point is recognized and stored.

It is assumed in the current embodiment that the electronic map applied to step S110 is an Internet-based electronic map provided by Google Earth.

However, the invention is not limited thereto, and thus, various media for storing map information as digital information and processing the map information using an information processing unit can be applied to the invention.

In step S110, the target point to be observed by the user can be automatically or manually selected. If the target point to be observed on the electronic map is selected, position information of the target point is recognized and stored. In this case, the position information is stored based on position information data from which the electronic map is formed, and in the case of the current embodiment for which the electronic map is an Internet-based electronic map provided by Google Earth, latitude and longitude coordinates using GPS technology are stored.

A search range of image files registered on the electronic map is set in step S120. The search range of image files can be set within a currently displayed screen of the electronic map on which the target point exists. For example, in the case of a PC, a current window of a computer screen on which the target point is displayed is set as the search range, and image files can be searched for within the current window. In this case, a manual setting method or an automatic setting method can be used as a method of setting a search range of image files. For example, the manual setting method can be used such that the user directly selects a current display screen corresponding to the search range from a menu screen of a search range set mode using a menu or a pop-up window, and the automatic setting method may be used in which the search range is set as default even if the user does not directly select the search range.

Besides the current display screen, the user may set the search range of image files as the user desires. For example, the user can set a radius from the target point to be observed as several meters or kilometers and search only image files located within the radius range. In addition, the radius of the search range can be associated with the height of the target point. For example, when the height or an altitude of a target object is high, image files within a relatively large radius may be searched for, and when the height of the target object is low, image files within a relatively small radius may be searched for. As obvious to one skilled in the art, as a method of setting a search range of image files, the manual setting method or the automatic setting method can be used.

Image files including an image of the target point are searched for from among image files within the set search range in step S130, which is discussed in detail in FIG. 2.

Referring to FIG. 2, image files within the search range are searched for in step S131. For example, if the search range of image files is a currently displayed screen of a PC, position information of the outermost boundary of the currently displayed screen (e.g., longitude coordinates of the leftmost position and the rightmost position and latitude coordinates of the uppermost and the lowermost position) is read, and image files having position information within a range of the read position information (e.g., latitude and longitude coordinates of each image file) are detected.

If detected image files exist, a predetermined order is assigned to the detected image files in step S132 and step S133.

Azimuth information and view angle information of a first image file to which the first order is assigned are analyzed in step S134. In the case of a photograph, the azimuth information is information indicating an image capturing direction of a camera based on a base line when the photograph is captured. In the case of a capturing device equipped with a terrestrial magnetic sensor, an azimuth angle based on the magnetic north or the true north can be stored as tag information of an image file. In the current embodiment, an azimuth angle based on the true north is used.

Figure 3:
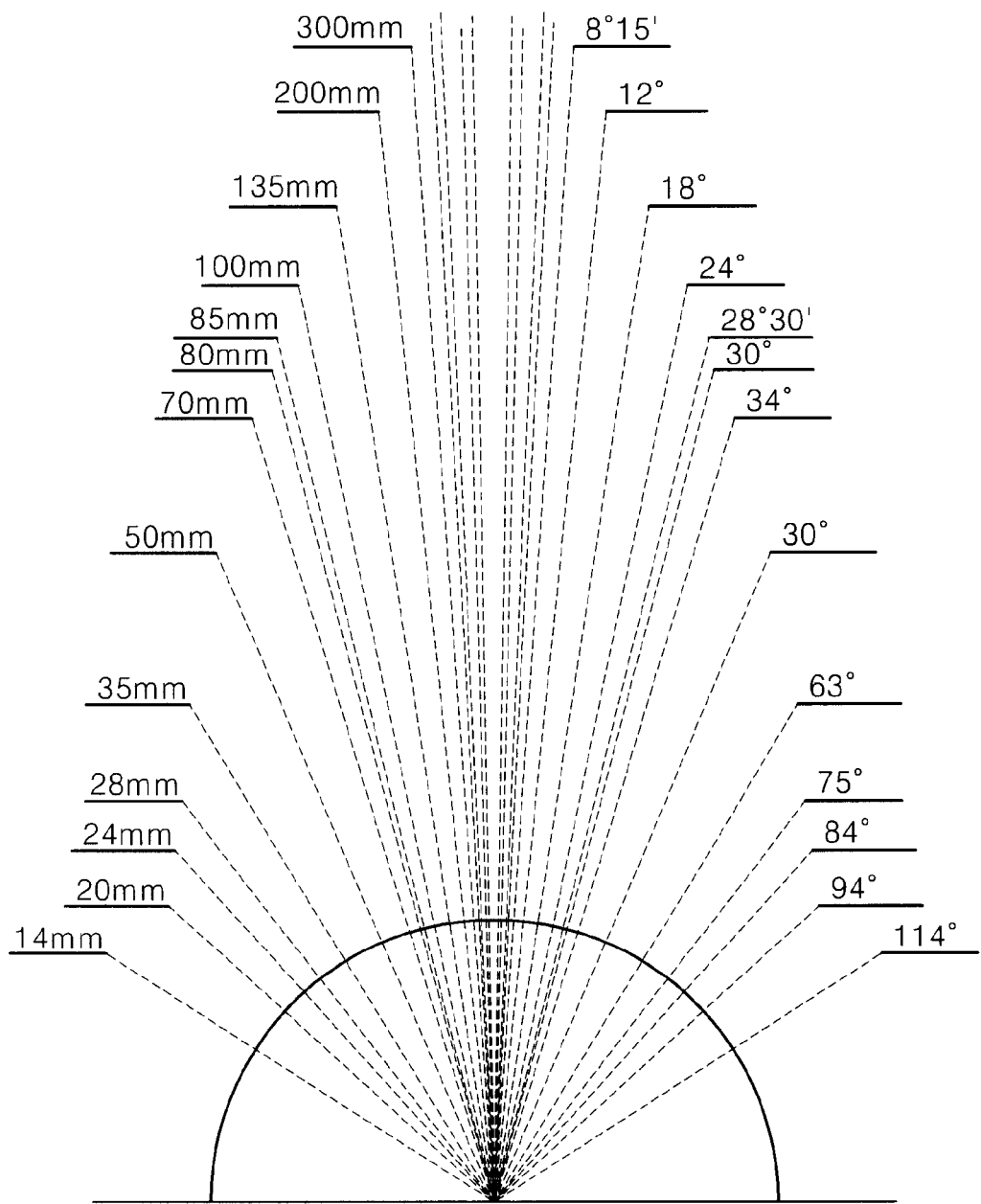
FIG. 3 is a diagram showing a comparison between 35 mm conversion focal lengths and angles of view.

The view angle information can be acquired from a camera when capturing the image. When the size of a charge coupled device (CCD) is already known, the view angle information can be calculated from Formula 1 (below) or a 35 mm conversion focal length diagram illustrated in FIG. 3.

$$\frac{CCD \text{ diagonal length}}{2} = f * \tan\left(\frac{\omega}{2}\right) \quad (1)$$

Here, f denotes a focal length, ω denotes an angle of view, and the units of the focal length and the diagonal length are in mm.

The azimuth information and the view angle information of an image file can be included in Exif (Exchangeable Image file Format) information of a registered image file. FIG. 4 illustrates Exif information of an image file, which includes view angle information and azimuth information of an image.

Referring to FIG. 4, the tag information of Exif includes additional information of image data, such as a captured date and time, an exposure time (shutter speed), an iris opening time lapse (F-number), International Organization of Standardization (ISO), a camera focal length, flash fired or not fired, an exposure mode, white balance, a 35 mm conversion focal length, a north or south latitude, an east or west longitude, an azimuth, a thumbnail image, and a main image. The tag information of Exif shown in FIG. 4 is just an illustration and the invention is not limited thereto.

After analyzing the azimuth information and the view angle information of the first image file, it is determined, in steps S135 and S136, whether the first image file includes an image of the target point by using Formula 2.

$$|\alpha - \beta| \leq \frac{\omega}{2} \quad (2)$$

Here, α denotes an azimuth angle with which an image of an image file is oriented, β denotes an azimuth angle of a line connecting between the image file and the target point, and ω denotes an angle of view of the image file, which will be described in more detail later.

If the first image file includes an image of the target point, an image of the first image file is displayed in step S140, and if an image file within the search range still exists, in steps S137 and S138, the above-described operations are repeated until the last image file is processed.

Figure 5:
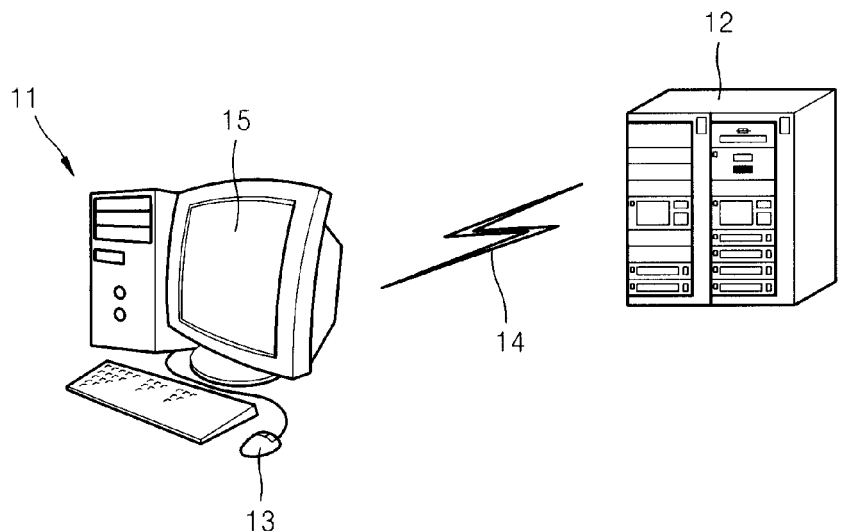
FIGS. 5 and 6 are illustrations of an image reproduction apparatus to which the image reproduction method is applied, according to an embodiment of the invention.
Figure 6:
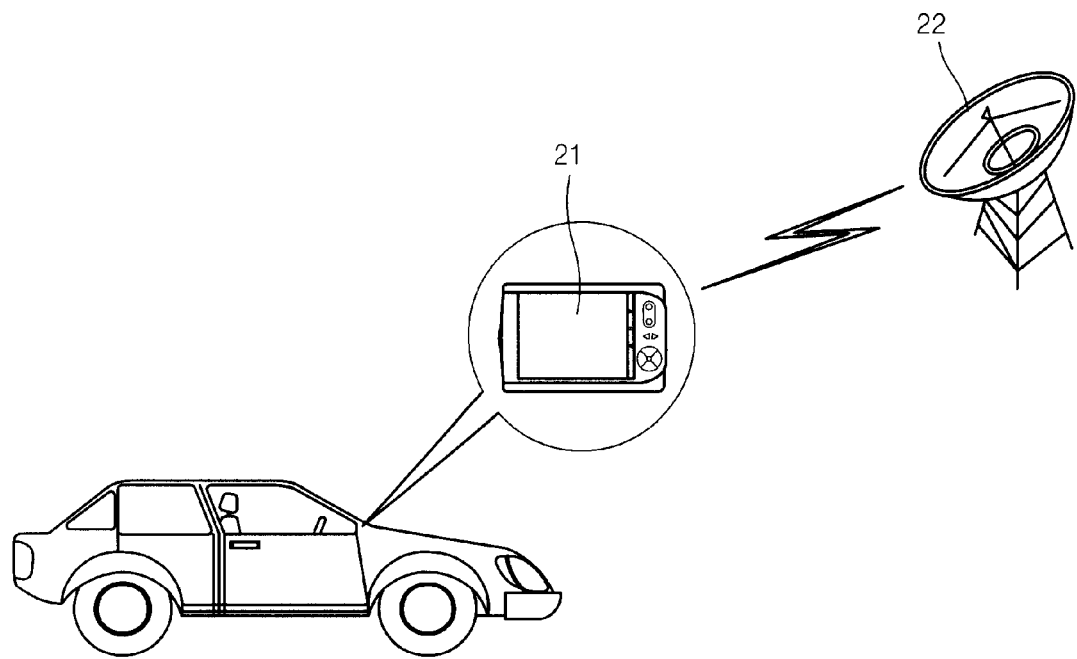

FIGS. 5 and 6 are illustrations of an image reproduction apparatus to which the image reproduction method is applied, according to an embodiment of the invention.

Referring to FIGS. 5 and 6, the image reproduction apparatus according to an embodiment of the invention can be applied to a PC 11 (refer to FIG. 5), which can be connected to a web server 12 via an Internet communication network 14, and a car navigator 21 (refer to FIG. 6) equipped with a GPS receiver (not shown) receiving GPS information from a GPS satellite 22. In addition, various devices having a display unit for implementing an electronic map, such as display unit equipped cellular phones and PDAs, which can be connected to a web server, can be used. Hereinafter, an exemplary embodiment of the invention will be described using the PC 11, which can be connected to the web server 12 (refer to FIG. 5).

Figure 7:
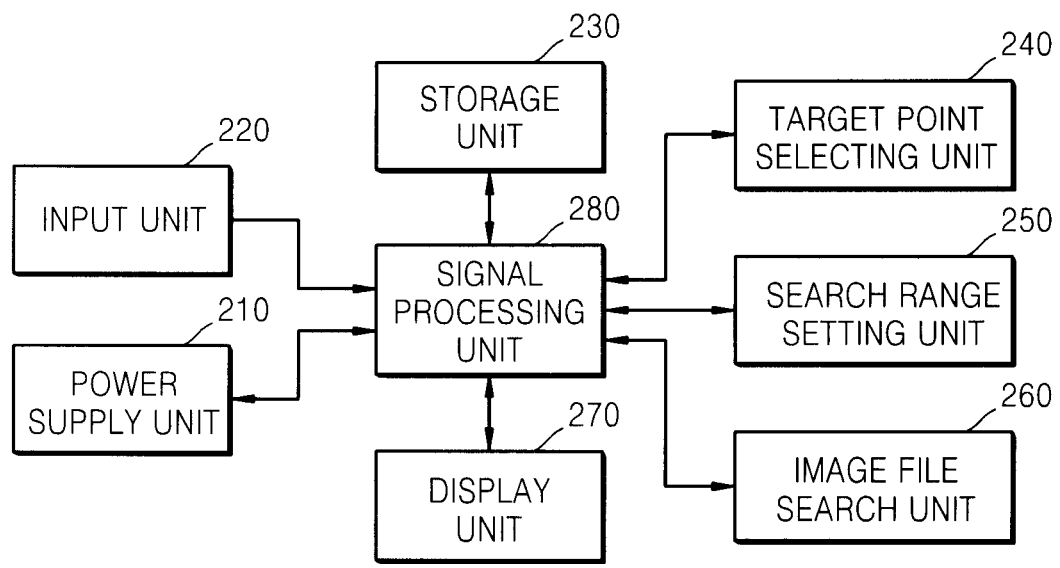
FIG. 7 is a schematic block diagram of an image reproduction apparatus according to an embodiment of the invention.

FIG. 7 is a schematic block diagram of an image reproduction apparatus according to an embodiment of the invention. Referring to FIG. 7, the image reproduction apparatus according to an embodiment of the invention includes a power supply unit 210, an input unit 220, a storage unit 230, a target point selecting unit 240, a search range setting unit 250, an image file search unit 260, a display unit 270, and a signal processing unit 280. The functions of the target point selecting unit 240, the search range setting unit 250, and the image file search unit 260 may be directly performed by the PC 11 (refer to FIG. 5), or performed by the web server 12 and the result may be displayed on the PC 11 via the Internet communication network 14.

The image reproduction apparatus is driven by receiving predetermined power from the power supply unit 210. An external signal input through the input unit 220 is processed by the signal processing unit 280 and transmitted to each necessary component of the image reproduction apparatus, and various kinds of data can be stored in the storage unit 230. A transceiver unit (not shown) for receiving data by means of Internet communication can be further included.

If a target point to be observed is selected automatically or by means of a selection of the user in the neighboring image search mode (S100) of the image reproduction method, as described above, the target point selecting unit 240 stores position information of the target point. For example, in the case of the PC 11 (refer to FIG. 5) connected to the web server 12, the user can select the target point by clicking a button of a mouse 13 on a position of the target point on a computer screen 15 on which an electronic map is displayed. In the case of the car navigator 21 (refer to FIG. 6), a current car position transmitted from the GPS transmitter 22 may be automatically set as the target point by being detected by the GPS receiver equipped in the navigator 21. In the case of the electronic map provided by Google Earth as the current embodiment, latitude and longitude coordinates of the selected target point are stored in the storage unit 230 as position information of the target point.

The search range setting unit 250 sets a search range of image files. In the case of the PC 11 (refer to FIG. 5), a currently displayed screen of an electronic map on which the target point exists or a range within a predetermined radius (or altitude associated radius) based on the target point can be set as the search range. As a method of setting a search range of image files, the manual setting method or the automatic setting method can be used. For example, the manual setting method in which the user directly selects the search range as a range within a current display screen or a predetermined radius on a menu screen of the search range setting mode using a menu or pop-up window can be used, and the automatic setting method in which the search range is set as default even if the user does not directly select the search range may be used.

Figure 8:
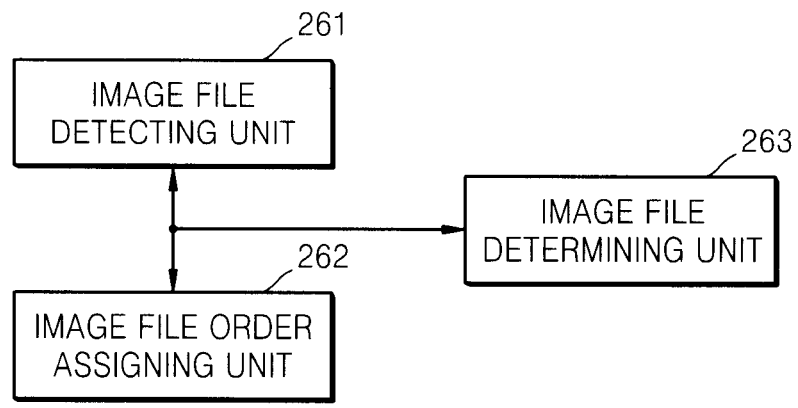
FIG. 8 is a block diagram of an image file search unit illustrated in FIG. 7, according to an embodiment of the invention.

The image file search unit 260 searches for image files including an image of the target point from among image files within the set search range as described above. FIG. 8 is a block diagram of the image file search unit 260 illustrated in FIG. 7, according to an embodiment of the invention. Referring to FIG. 8, the image file search unit 260 includes an image file detecting unit 261, an image file order assigning unit 262, and an image file determining unit 263.

The image file detecting unit 261 detects image files within the set search range, and if the image files detected by the image file detecting unit 261 exist, the image file order assigning unit 262 assigns a predetermined order to the detected image files. The image file determining unit 263 analyzes azimuth information and view angle information of the first image file to the last image file in the order assigned by the image file order assigning unit 262 and determines whether the detected image files include the image of the target point by using Formula 2.

Images of the image files determined as including the image of the target point by the image file determining unit 263 are displayed on the display unit 270.

Figure 9:
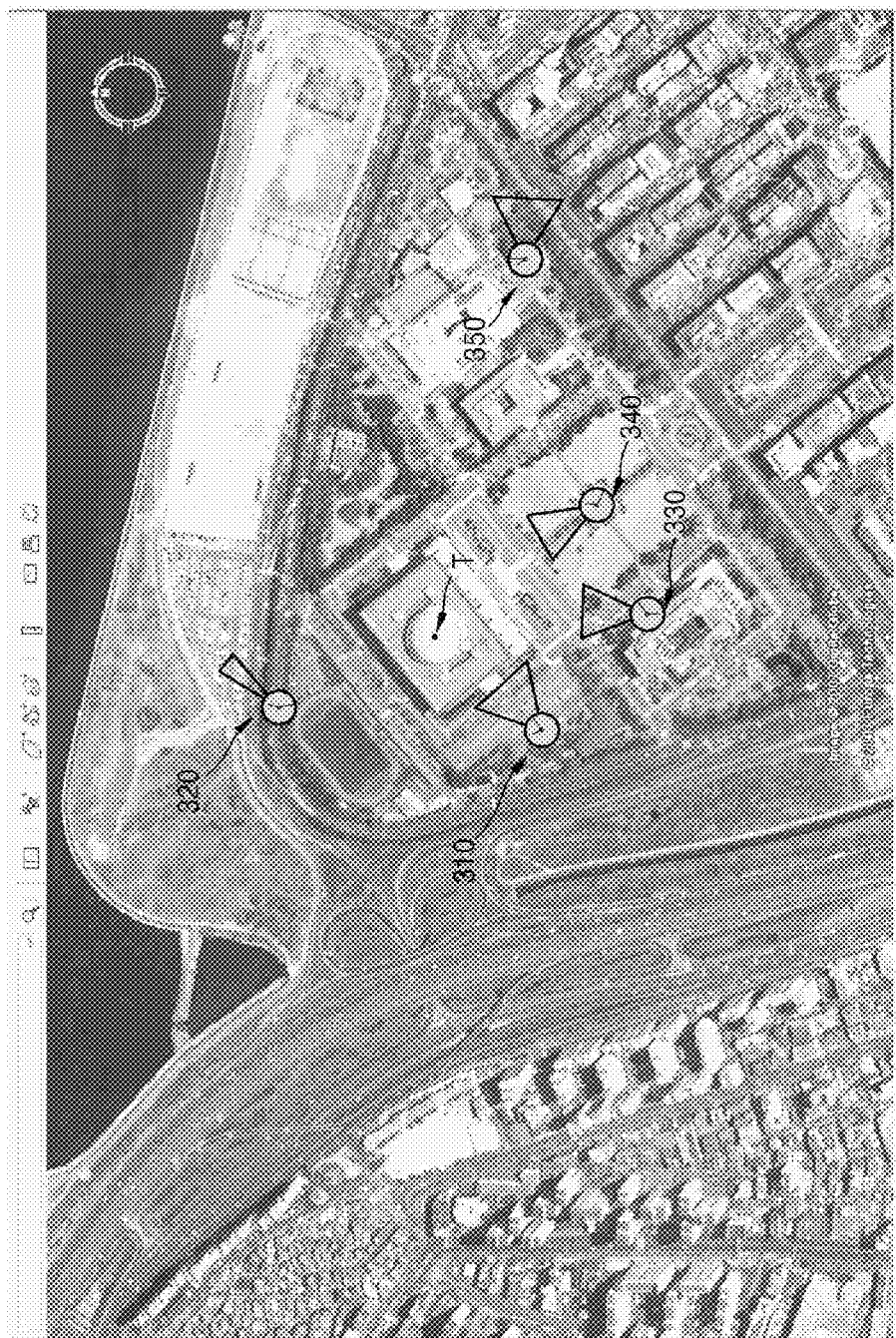
FIG. 9 illustrates icons of image files within a search range, which are displayed on an electronic map, according to an embodiment of the invention.

FIG. 9 illustrates icons 310, 320, 330, 340, and 350 of image files within a search range, which are displayed on an electronic map, according to an embodiment of the invention.

The electronic map illustrated in FIG. 9 is an electronic map including satellite photographs provided by Google Earth, which is an Internet-based map search service.

A target point T to be observed on the electronic map is selected as the National Assembly building located in Yeouido, Seoul, Republic of Korea. That is, in the neighboring image search mode (S110, refer to FIG. 1), if a user points the cursor with the mouse 13 (refer to FIG. 5) on the National Assembly building, the latitude (N 37° 31' 55.23") and the longitude (E 126° 54' 50.73") of the point T indicated by cursor of the mouse 13 from among the GPS information provided by Google Earth are stored in the storage unit 230 (refer to FIG. 7) of the image reproduction apparatus.

If a search range of image files is set as a screen on which an electronic map including the National Assembly building as the target point T is currently displayed on the computer screen 15 (refer to FIG. 5), position information of the search range of image files is stored in the storage unit 230. Although not shown, longitude coordinates (E 126° 54' 16.80" and E 126° 55' 20.40") of the leftmost and the rightmost position and latitude coordinates (N 37° 31' 37.21" and N 37° 32' 10.25") of the lowermost and the uppermost position of a computer screen measured when an image of the electronic map was captured are stored in the storage unit 230 as boundary values of the search range of image files.

Image files having position information within the boundary values of the search range are searched for, and if there are image files, an order is assigned to the image files in a predetermined method. In the case of this illustration, the image files are indicated by the icons 310, 320, 330, 340, and 350 on the electronic map of the current computer screen, and since the image files indicated by the icons 310, 320, 330, 340, and 350 are within the boundary values of the search range, a predetermined order is assigned to the image files indicated by the icons 310, 320, 330, 340, and 350 in a predetermined method. In the current embodiment, the order is assigned in the order from a low longitude to a high longitude and from a low latitude to a high latitude under the same longitude. The icons 310, 320, 330, 340, and 350 displayed on the electronic map are shaped as icon shapes in order to easily view position information, azimuth information, and view angle information of image files, and since a method of registering icons on an electronic map is disclosed in Korean Patent Application No. 2007-60063 (2007 Jun. 19) as applied by the applicant, such icon registering method is not described. The invention is not limited to only a case where all of position information, azimuth information, and view angle information are shaped and displayed as the icons 310, 320, 330, 340, and 350, as described above. If position information, azimuth information, and view angle information of image files are associated with an electronic map, the invention also can be applied to a case where only position information is shaped as an icon and a case where image files are not indicated by icons. In addition, in the electronic map, the sizes of the icons 310, 320, 330, 340, and 350 are exaggerated, and only a portion of the image files are displayed as the icons 310, 320, 330, 340, and 350.

The image file determining unit 263 (refer to FIG. 8) analyzes azimuth information and view angle information of the image files within the search range and determines whether the image files include an image of the National Assembly building, which is the target point T, by using Formula 2.

Figure 10:
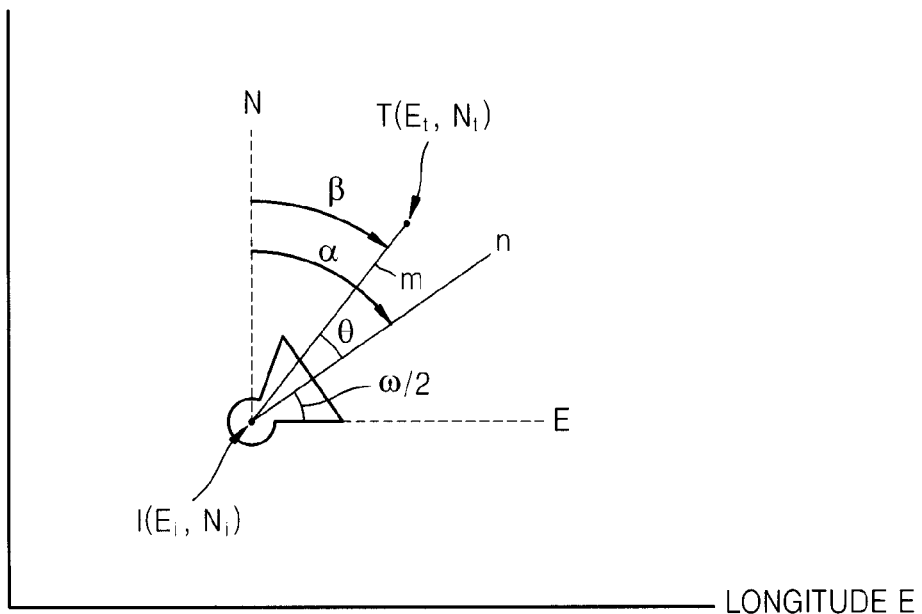
FIG. 10 illustrates a coordinate system showing the correlation between an image file within a search range and a target point.

FIG. 10 illustrates a coordinate system showing the correlation between an image file within a search range and a target point in order to explain Formula 2. When an electronic map provided by Google Earth is used, the horizontal axis and the vertical axis of the coordinate system respectively denote a longitude and a latitude.

In the drawing, $I(E_i, N_i)$ indicates a longitude coordinate $E_i$ and a latitude coordinate $N_i$ of an image file, and a dotted line passing through $I(E_i, N_i)$ of the image file in parallel to the vertical axis indicates the true north N. A direct line n indicates a direction with which an image of the image file is headed for, wherein $\alpha$ denotes an azimuth angle measured clockwise based on the true north N as an angle between the dotted line denoting the true north N and the direct line n. The azimuth angle $\alpha$ can be obtained from azimuth information of Exif information of the image file.

$T(E_t, N_t)$ indicates a longitude coordinate $E_t$ and a latitude coordinate $N_t$ of a target point. A direct line m is a line connecting between the image file and the target point, wherein $\beta$ denotes an azimuth angle measured clockwise based on the true north N as an angle between the dotted line denoting the true north N and the direct line m and can be obtained by Formula 3.

$$\tan\beta = \frac{E_t - E_i}{N_t - N_i} \quad (3)$$

Here, $E_t$ denotes a longitude coordinate of the target point, $E_i$ denotes a longitude coordinate of the image file, $N_t$ denotes a latitude coordinate of the target point, and $N_i$ denotes a latitude coordinate of the image file.

When the angle $\theta$ corresponding to the difference $|\alpha-\beta|$ between the azimuth angle $\alpha$ of the line n and the azimuth angle $\beta$ of the line connecting between the image file and the target point is equal to or less than ½ of an angle of view $\omega$ of the image file, i.e., when Formula 2 is satisfied, the image of the image file includes the image of the target point.

Table 1 shows the position information, the azimuth information, and the view angle information of the image files indicated by the icons 310, 320, 330, 340, and 350 displayed on the electronic map illustrated in FIG. 9. The data of the image files shown in Table 1 may have some errors from the actual data in a process of capturing an image of the electronic map and displaying the icons on the captured electronic map in order to attach the data to the application.

TABLE 1

| Image file | Reference numeral | Longitude | Latitude | Azimuth angle | Angle of view |
|---|---|---|---|---|---|
| 1 | 310 | E 126° 54' 45.99" | N 37° 31' | 48° | 58° |
| 2 | 320 | E 126° 54' 47.75" | N 37° 32' | 40° | 18° |
| 3 | 330 | E 126° 54' 51.01" | N 37° 31' | 2° | 45° |
| 4 | 340 | E 126° 54' 56.87" | N 37° 31' | 330° | 43° |
| 5 | 350 | E 126° 55' 09.28" | N 37° 31' | 92° | 60° |

Since the first image file indicated by the icon 310 illustrated in FIG. 9 has the minimum longitude value from among the image files within the search range, the image file order assigning unit 262 (refer to FIG. 8) assigns the first order to the first image file.

The image file determining unit 263 (refer to FIG. 8) determines whether the first image file includes an image of the target point T by using Formula 2.

Formula 2 is calculated according to the following steps. The azimuth angle α of the first image file is 48°. The azimuth angle β of a line connecting between the first image file and the target point T is calculated by using Formula 3. That is, by substituting the latitude coordinate $N_t$ (N 37° 31' 55.23") and the longitude coordinate $E_t$ (E 126° 54' 50.73") of the target point T and the latitude coordinate $N_i$ (N 37° 31' 51.30") and the longitude coordinate $E_i$ (E 126° 54' 45.99") of the first image file into Formula 3, β is calculated as approximately 55.33°. The angle of view ω is 58°. Since |α−β| is 7.33°, which is less than ω/2, Formula 3 is satisfied. Thus, the image of the first image file includes an image of the target point T.

Since the second image file indicated by the icon 320 illustrated in FIG. 9 has the second lowest longitude value from among the image files within the search range, the image file order assigning unit 262 (refer to FIG. 8) assigns the second order to the second image file.

The image file determining unit 263 (refer to FIG. 8) determines whether the second image file includes an image of the target point T by using Formula 2.

Formula 2 is calculated according to the following steps. The azimuth angle α of the second image file is 40°. The azimuth angle β of a line connecting between the second image file and the target point T is calculated by using Formula 3. That is, by substituting the latitude coordinate $N_t$ (N 37° 31' 55.23") and the longitude coordinate $E_t$ (E 126° 54' 50.73") of the target point T and the latitude coordinate $N_i$ (N 37° 32' 01.21") and the longitude coordinate $E_i$ (E 126° 54' 47.75") of the second image file into Formula 3, β is calculated as approximately 153°. The angle of view ω is 18°. Since |α−β| is around 113°, which is greater than ω/2, Formula 3 is not satisfied. Thus, the image of the second image file does not include an image of the target point T.

In the same method, the image file determining unit 263 (refer to FIG. 8) determines whether images of the third to fifth image files include an image of the target point T and displays images of the first, third and fourth image files, which are determined as including an image of the target point T, on the electronic map.

Figure 11:
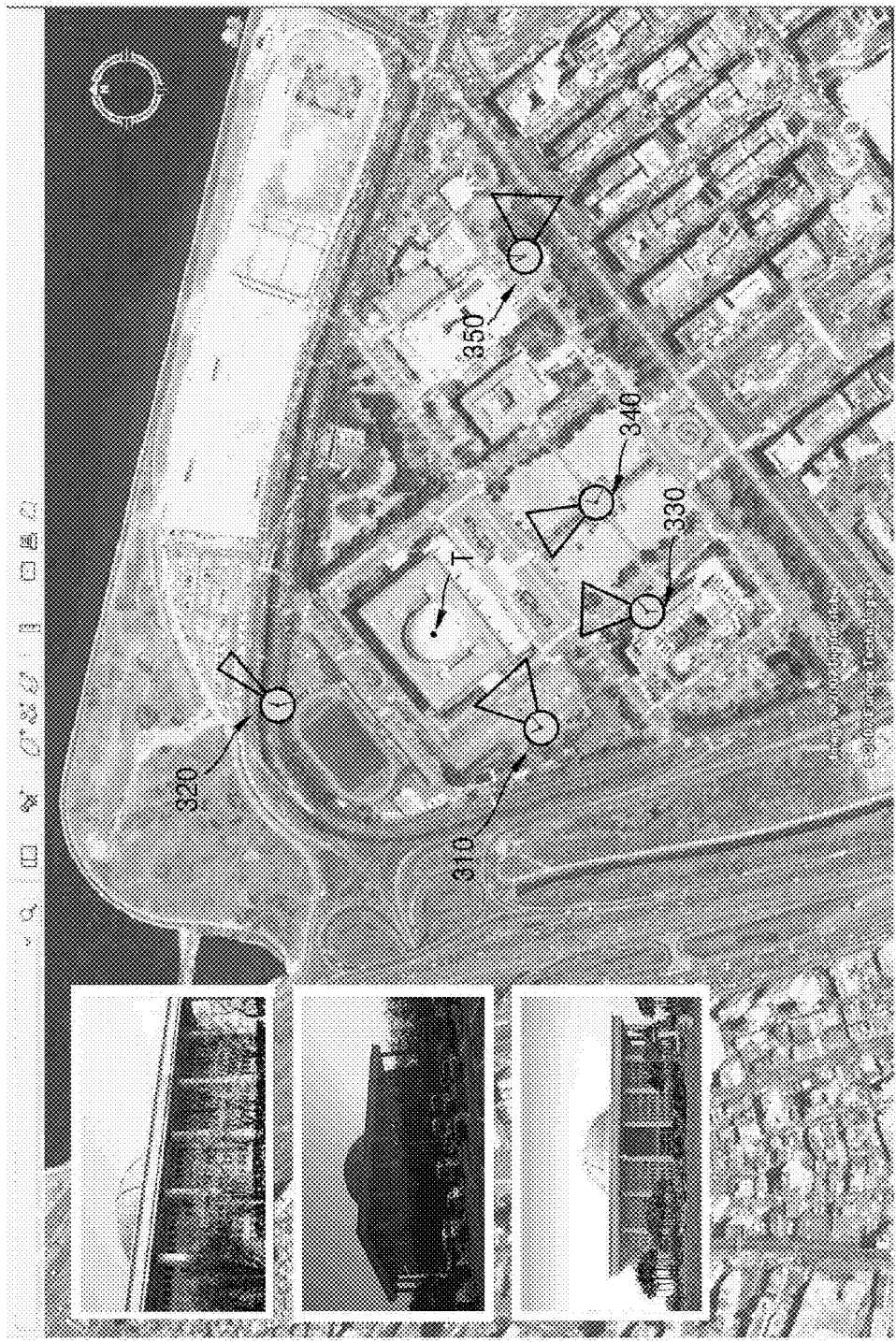
FIG. 11 illustrates images of image files including an image of a target point, which are displayed on an electronic map.

FIG. 11 illustrates images of image files including an image of a target point, which are displayed on an electronic map, according to an embodiment of the invention.

Although the images of the image files are displayed on the left side of the electronic map in the drawing, the drawing is just an illustration, and the invention is not limited thereto. Hence, the images of the image files can be displayed in other locations as the ones shown. Icons associated with image files of which images are displayed can further represent a signal informing that the images are displayed by using a method of applying different colors to the icons or illuminating the icons.

As described above, the method of reproducing an image on an electronic map and the image reproduction apparatus, according to embodiments of the invention, allow a user to observe an image of a target point by detecting image files including an image of a target point using position information, azimuth information, and view angle information of image files located adjacent to the target point and displaying the images of the image files including the target point on the electronic map.

Figure 12:
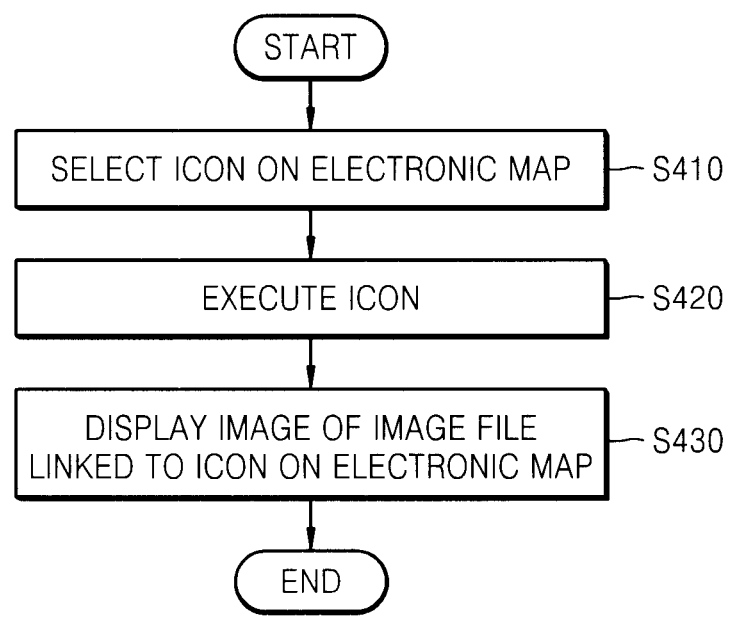
FIG. 12 is a flowchart of an image reproduction method, according to another embodiment of the invention.

FIG. 12 is a flowchart of an image reproduction method, according to another embodiment of the invention.

The method of reproducing an image on an electronic map according to the current embodiment is applied to an electronic map on which predetermined icons indicating position information, azimuth information, and view angle information of an image file are displayed, wherein the position information of the image file matches position information on the electronic map. In other words, in the embodiments described above, all of position information, azimuth information, and view angle information of image files do not have to be displayed as icons on an electronic map, and the embodiments described above can be applied even to a case without any icons. However, the current embodiment is applied to an electronic map on which icons easily indicating position information, azimuth information, and view angle information of image files are displayed.

In addition, in the embodiments described above, in order to search for an image file including an image of a target point, complex formulas using position information of the target point, and position information, azimuth information, and view angle information of the image file are used. However, in the current embodiment, by using shapes of icons obtained by shaping information on image files, it can be easily and intuitively determined whether an image file includes an image of the target point.

Referring to FIG. 12, a user selects an icon oriented towards an image of a target point to be observed by using shapes of image files displayed on an electronic map in step S410. As obvious to one skilled in the art, in order for the user to determine with only shapes of the icons whether each image file associated with a corresponding icon includes the image of the target point, the shapes of the icons must be shaped to easily obtain position information, azimuth information, and view angle information of each image. As described above, since a method of displaying icons on an electronic map is disclosed in Korean Patent Application No. 2007-60063 (2007 Jun. 19), which was applied by the applicant, the icon display method is not described.

After selecting the icon oriented towards the image of the target point, an input signal, for executing the icon, is generated by clicking the cursor with a mouse or using another input device in step S420. If a command for executing the icon is input, an image of an image file linked to the icon is displayed on the electronic map in step S430.

According to the current embodiment, when an icon, easily indicating position information, azimuth information, and view angle information of an image file, is displayed on the electronic map as illustrated in FIG. 9, it can be easily determined whether a selected icon corresponds to an image file including an image of a target point only with the shapes of icon.

The invention can be applied to a computer readable recording medium having embodied thereon a program for executing a method of reproducing an image of an image file included in an electronic map. Examples of the computer readable recording medium include storage media such as magnetic storage media (e.g., read-only memories (ROMs), floppy disks, hard disks, or magnetic tapes), optically readable media (e.g., compact disk-read only memories (CD-ROMs), or digital versatile disks (DVDs), and carrier waves (e.g., transmissions over the Internet).

The computer readable recording medium can also be distributed over network coupled computer systems so that the computer readable code is stored and executed in a distributed fashion. Also, functional programs, codes, and code segments for accomplishing the invention can be easily construed by programmers skilled in the art to which the invention pertains.

As described above, according to the invention, even if an image file corresponding to a target point to be observed does not exist, an image of the target point can be observed by using image files located adjacent to the target point.

In addition, by allowing various search ranges to be set, user convenience increases, and when image files are indicated by icons, it can be determined whether an image file includes the image of the target point only with the shapes of icons.

While the invention has been particularly shown and described with reference to exemplary embodiments thereof, it will be understood by one of ordinary skill in the art that various changes in form and details may be made therein without departing from the spirit and scope of the invention as defined by the following claims.

What is claimed is:

1. A method of reproducing an image of an image file on an electronic map on which a predetermined icon indicating position information, azimuth information, and view angle information of the image file is displayed, wherein position information of the image file matches position information on the electronic map, the method comprising:
   (a) receiving a selection of a target point to be observed on the electronic map on a display of a computer comprising a processor and obtaining position information of the target point;
   (b) setting a search range within the displayed electronic map;
   (c) searching for and locating one or more image files including an image of the target point within the set search range using the processor; and
   (d) displaying icons indicating position information, azimuth information, and subtended view angle information of the one or more located image files based upon Exif information contained within respective said one or more located image files using the icon shape on the electronic map via the computer display;
   wherein step (c) comprises:
      detecting image files having position information included within the set search range; and
      analyzing azimuth information and view angle information of the image files and determining whether the image files may include an image of the target point.

2. The method of claim 1, wherein step (d) comprises:
   displaying the icons corresponding to the searched and located one or more image files oriented toward an image of a target point to be observed on the electronic map via the computer display.

3. The method of claim 1, wherein step (b) comprises:
   setting the search range bounded by a currently displayed screen on the electronic map in which the target point is included.

4. The method of claim 1, wherein step (b) comprises:
   setting the search range within a predetermined radius range based on the target point.

5. The method of claim 1, wherein step (c) further comprises:
   assigning an order to the detected image files;
   wherein the analyzing of the azimuth information and view angle information is done in the assigned order.

6. The method of claim 5, wherein the analyzing of the azimuth information and the view angle information of the image files in the assigned order and determining of whether the image files may include the image of the target point is determined using the Formula below $$|\alpha - \beta| \le \frac{\omega}{2},$$

where $\alpha$ denotes an azimuth angle with which an image of an image file is oriented, $\beta$ denotes an azimuth angle of a line connecting between the image file and the target point, and $\omega$ denotes an angle of view of the image file.

7. The method of claim 6, wherein $\beta$ is calculated using the Formula below $$\tan\beta = \frac{E_t - E_i}{N_t - N_i},$$

where $E_t$ denotes a longitude coordinate of the target point, $E_i$ denotes a longitude coordinate of the image file, $N_t$ denotes a latitude coordinate of the target point, and $N_i$ denotes a latitude coordinate of the image file.

8. The method of claim 6, wherein is calculated from a 35 mm conversion focal length.

9. The method of claim 6, wherein $\omega$ is calculated using the Formula below $$\frac{CCDdiagonallength}{2} = f * \tan\left(\frac{\omega}{2}\right),$$

where f denotes a focal length, $\omega$ denotes an angle of view, and the units of the focal length and the diagonal length are in mm.

10. The method of claim 1 further comprising:
   (e) receiving a selection of an icon indicating position information, azimuth information, and subtended view angle information of the image file using the icon shape;
   (f) executing the selected icon; and
   (g) displaying an image of an image file linked to the selected icon, the displayed image being overlaid on the electronic map via the computer display.

11. The method of claim 1, wherein the Exif information comprises additional information of image data, including a captured date and time, an exposure time (shutter speed), an iris opening time lapse (F-number), International Organization of Standardization (ISO), a camera focal length, flash fired or not fired, an exposure mode, white balance, a 35 mm conversion focal length, a north or south latitude, an east or west longitude, an azimuth, a thumbnail image, and a main image.

12. A method of reproducing an image of an image file on an electronic map on which a predetermined icon indicating position information, azimuth information, and view angle information of the image file is displayed, wherein position information of the image file matches position information on the electronic map, the method comprising:
   (a) receiving a selection of a target point to be observed on the electronic map on a display of a computer comprising a processor and obtaining position information of the target point;
   (b) setting a search range within the displayed electronic map;
   (c) searching for and locating one or more image files including an image of the target point within the set search range using the processor; and
   (d) displaying icons indicating position information, azimuth information, and subtended view angle information of the one or more located image files based upon Exif information contained within respective said one or more located image files using the icon shape on the electronic map via the computer display;
wherein step (b) comprises:
setting the search range within a predetermined radius range based on the target point;
wherein the predetermined radius range varies based on an altitude of an image taken at the target point.

13. An apparatus comprising:
a display device;
an input device to receive a selection of a target point on an electronic map; and
a processor programmed to at least:
  search for an image file including an image of the target point in a search range around the target point;
  display icons indicating position information, azimuth information, and subtended view angle information of the image file based upon Exif information contained within respective one or more located image files using the icon shape on the electronic map via the computer display unit;
  identify image files having position information included within the search range; and
  analyze azimuth information and view angle information of each of the image files to determine which of the image files may include an image of the target point.

14. The apparatus of claim 13, wherein the processor is further programmed to:
  assign an order to the image files; and
  utilize the assigned order to analyze the azimuth information and view angle information of each of the image files.

15. The apparatus of claim 13, wherein the processor is further programmed to obtain the electronic map in real-time from an external server using Internet communication.

16. The apparatus of claim 13, wherein the apparatus is a Personal Computer (PC).

17. The apparatus of claim 13, wherein the apparatus is a car navigator.

18. The apparatus of claim 13, further comprising:
  an icon selecting unit that selects an icon indicating position information, azimuth information, and subtended view angle information of the image file using the icon shape;
  an icon execution unit that executes the selected icon; and
  a display unit that displays an image of an image file linked to the icon on the electronic map.

19. The apparatus of claim 13, wherein the Exif information comprises additional information of image data, including a captured date and time, an exposure time (shutter speed), an iris opening time lapse (F-number), International Organization of Standardization (ISO), a camera focal length, flash fired or not fired, an exposure mode, white balance, a 35 mm conversion focal length, a north or south latitude, an east or west longitude, an azimuth, a thumbnail image, and a main image.

* * * * *